United States Patent [19]

Kanemasa et al.

[11] Patent Number: 4,730,343

[45] Date of Patent: Mar. 8, 1988

[54] DECISION FEEDBACK EQUALIZER WITH A PATTERN DETECTOR

[75] Inventors: Akira Kanemasa; Akihiko Sugiyama, both of Tokyo, Japan

[73] Assignee: NEC Corporation, Tokyo, Japan

[21] Appl. No.: 901,211

[22] Filed: Aug. 28, 1986

[30] Foreign Application Priority Data

Aug. 28, 1985 [JP] Japan .............................. 60-190726
Aug. 28, 1985 [JP] Japan .............................. 60-190727
Sep. 2, 1985 [JP] Japan .............................. 60-194329
Apr. 18, 1986 [JP] Japan .............................. 61-90745

[51] Int. Cl.$^4$ .............................................. H04B 3/04
[52] U.S. Cl. ........................................ 375/14; 375/103; 455/306
[58] Field of Search ..................... 375/12, 14, 18, 34, 375/101, 103; 329/104, 168; 367/45; 455/296, 305, 306; 328/162; 333/18, 28; 379/394, 398; 364/825, 724

[56] References Cited

U.S. PATENT DOCUMENTS

| 4,441,192 | 4/1984 | Kita et al. ............................ 375/14 |
| 4,476,491 | 10/1984 | Murata et al. ...................... 375/14 |
| 4,528,676 | 7/1985 | Mein et al. ........................ 375/101 |

OTHER PUBLICATIONS

"Some Considerations on the Design of Adaptive Digital Filters Equipped with the Sign Algorithym", IEEE Transactions on Communications, vol. COM-32, No. 3, Mar. 1984, pp. 258–266.

"A Study on the Subscriber Loop Transmission System for ISDN Based on the Echo Cancellation Technique", IEEE Intl Conf. on Comm., vol. SAC-2, No. 2, Mar. 1984, pp. 314–323.

Primary Examiner—Benedict Safourek
Attorney, Agent, or Firm—Sughrue, Mion, Zinn, Macpeak & Seas

[57] ABSTRACT

An improved decision feedback equalizer, which removes intersymbol interference from pulse transmissions having a desired period, includes an arithmetic circuit (9) for extracting a residual intersymbol interference signal from a residual signal and a delayed residual signal which is produced by delaying the residual signal. The residual signal is produced by a subtractor circuit (2) which subtracts an estimated intersymbol interference signal from the pulse transmissions. A pattern detector circuit (11) is also provided to detect a particular consecutive pattern from a demodulated data sequence produced by a decision or detection circuit (3) for demodulating the residual signal. The residual intersymbol interference signal and a reference signal are inputted to a selector (10) responsive to the output of the pattern detector circuit. The output of the selector is sent to an adaptive filter circuit (50) which also receives the demodulated data sequence produced by the detection circuit and outputs the estimated intersymbol interference signal. The decision feedback equalizer can be modified to provide additional adaptive filter circuits for estimating intrasymbol interference, such that both intersymbol and intrasymbol interference signals can be removed from the pulse transmissions.

7 Claims, 22 Drawing Figures

"0"  "1"

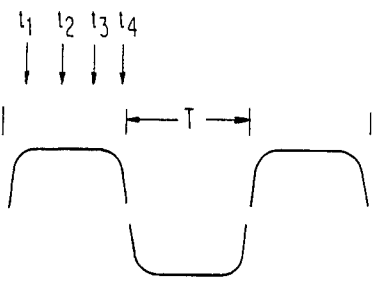
FIG.4A "000"
FIG.4B "111"
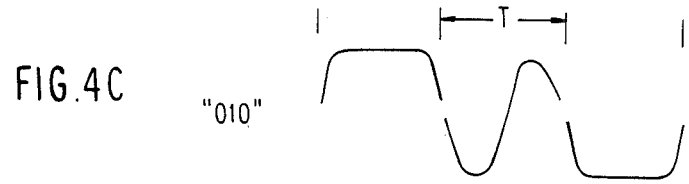
FIG.4C "010"
FIG.4D "101"
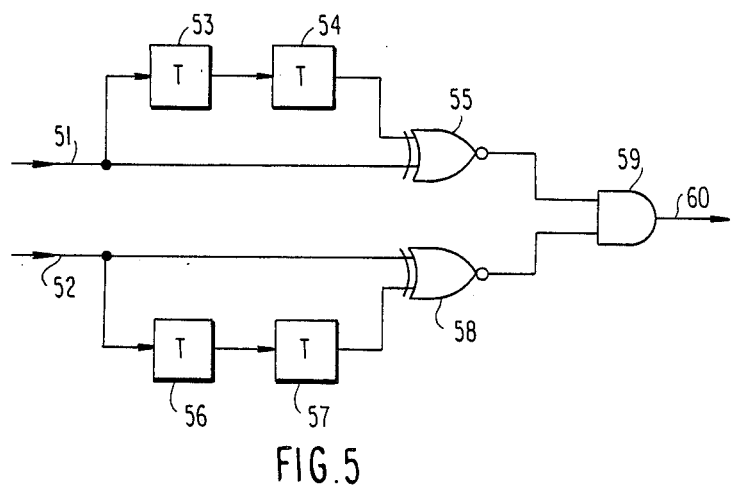
FIG.5

CODE SEQUENCE 000
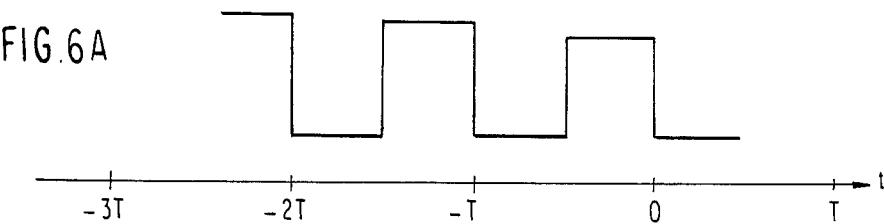
FIG.6A
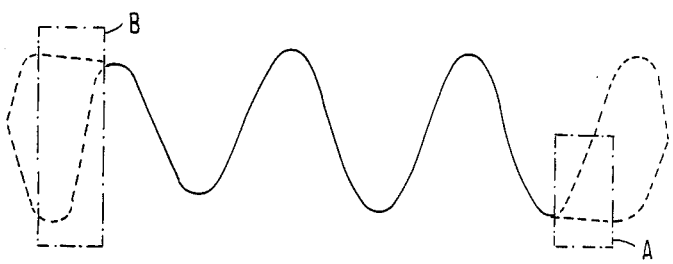
FIG.6B
$t=-2T$    $t=0$
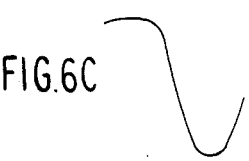  
FIG.6C    FIG.6E
  
FIG.6D    FIG.6F
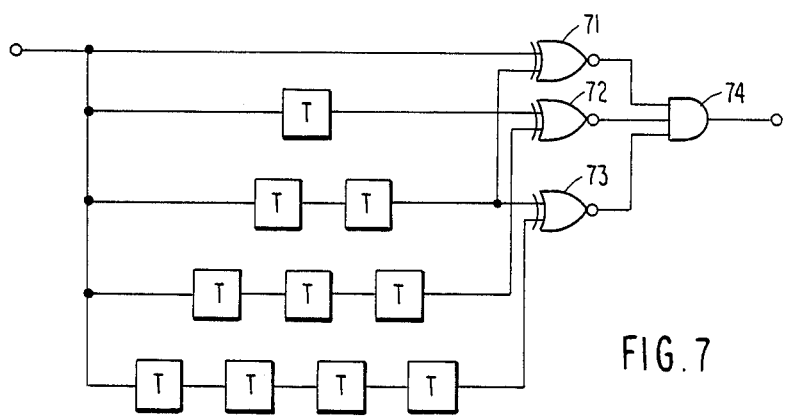
FIG.7

DECISION FEEDBACK EQUALIZER WITH A PATTERN DETECTOR

BACKGROUND OF THE INVENTION

The present invention relates to a decision feedback equalizer (DFE) for removing intersymbol interference (ISI) which is particular to pulse transmission.

A DFE is one of the implementations heretofore proposed for the removal of ISI which occurs during pulse transmissions. In a DFE, an adaptive filter having taps corresponding to a length over which ISI has as influence is installed to generate estimated ISI, so that the actual ISI occurring during the transmission of pulses over a channel may be suppressed. The tap coefficients of the filter are sequentially corrected or updated by determining the correlation between the predicted residual ISI of a received signal.

A problem with a DFE is that the adaptive operation is unachievable unless the residual ISI obtain residual signal which is produced by subtracting estimated ISI from a received signal having ISI, is accurately detected to enable the correction of the coefficients. For example, where a biphase or a two-level code which will be described later is used as a transmission line code, extracting just the ISI is impractical because the received signal level has no zero level duration due to the particular nature of two-level codes; the DFE thus fails to correct the tap coefficients.

A solution to the above problem is proposed in a paper entitled "Some Considerations on the Design of Adaptive Digital Filters Equipped with the Sign Algorithm", IEEE Transactions on Communications, Vol. COM-32, No. 3, March 1984, pp. 258-266. The approach as described in this paper is to equip a DFE with a subtractor and an automatic gain control (AGC) circuit to remove all signals except the ISI. Such a scheme, however, undesirably scales up the hardware requirements partly because the AGC circuit is essential and partly because a complicated control is necessary for a signal which is fed from the AGC to the subtractor and free from ISI to be maintained at an adequate level.

SUMMARY OF THE INVENTION

It is therefore an object of the present invention to eliminate the drawbacks particular to the prior art DFE and provide a DFE which is simple in construction and small in scale.

A DFE in accordance with the present invention comprises first adaptive filter means responsive to a demodulated data sequence and a residual ISI signal for estimating ISI which occurs during pulse transmission of a period of T seconds and producing an estimated ISI signal, first subtractor means for subtracting the estimated ISI signal from a received signal having an ISI signal to produce a residual signal, means for extracting the residual ISI signal from the residual signal and a delayed residual signal which is produced by delaying the residual signal, first demodulating means for producing the demodulated data sequence from the residual signal and applying the demodulated data sequence to the first adaptive filter means, pattern detector means for detecting a particular consecutive pattern out of the demodulated data sequence, and means for applying the residual ISI signal to the filter means in response to an output of the pattern detector means.

BRIEF DESCRIPTION OF THE DRAWINGS

The above and other objects, features and advantages of the present invention will become more apparent from the following detailed description taken in conjunction with the accompanying drawings in which:

FIGS. 4A to 4D and FIGS. 6A to 6F show waveforms for explaining the principle of the pattern detector according to the present invention;

FIGS. 5 and 7 are circuit diagrams of a specific construction of the pattern detector according to the invention;

It is to be noted that throughout the drawings the same or similar structural elements are designated by like reference numerals.

DETAILED DESCRIPTION OF THE PREFERRED EMBODIMENTS

For a better understanding of the present invention, transmission line codes which are applicable to various embodiments of the present invention will be described.

Figure 1:
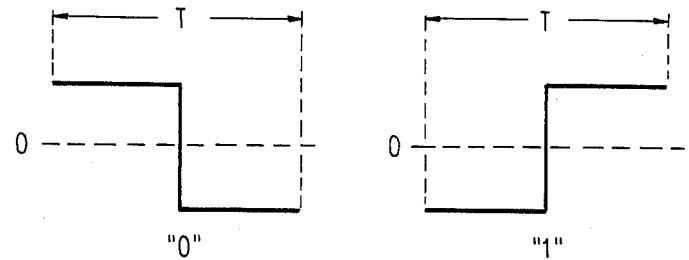
FIGS. 1 and 2 show waveforms representative of transmission channel codes.
Figure 2:
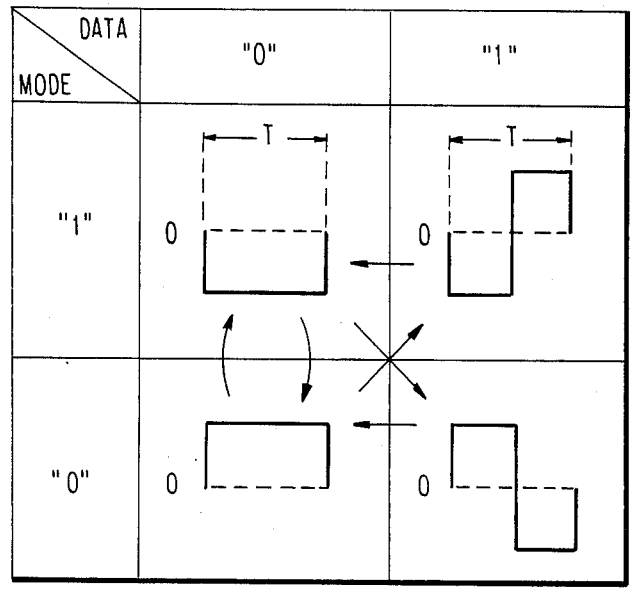

FIG. 1 shows a biphase code and FIG. 2 shows a minimum shift keying (MSK) code. As shown in FIG. 1, the biphase code assigns pulse shapes of opposite polarities to data ONE and ZERO. In each of the two pulse shapes have the polarities of their signal levels invert at the center of one bit width, i.e., one bit width equals T seconds and the positive and negative signal levels have equal absolute values so as to be balanced within one bit. In contrast, the MSK code is implemented with four different kinds of pulse shapes, as shown in FIG. 2. Specifically, the MSK code assigns two different kinds of pulse shapes of opposite polarities, i.e., a ONE mode and a ZERO mode to each of data ZERO and ONE, the transitions of the four pulse shapes being represented by arrows in FIG. 2. The MSK code is characterized in that the polarity is necessarily inverted at the point of interconnection of transmitted pulse shapes. As shown in FIG. 2, the MSK code is balanced for a data ONE within one pulse shape but not for a data ZERO, each in terms of positive-negative levels. Nevertheless, it will be seen from the directions of the arrows of FIG. 2 that if an even number of data ZEROs exist in a data sequence, the positive-negative balance is set up so that the DC component is almost negligible.

Figure 3:
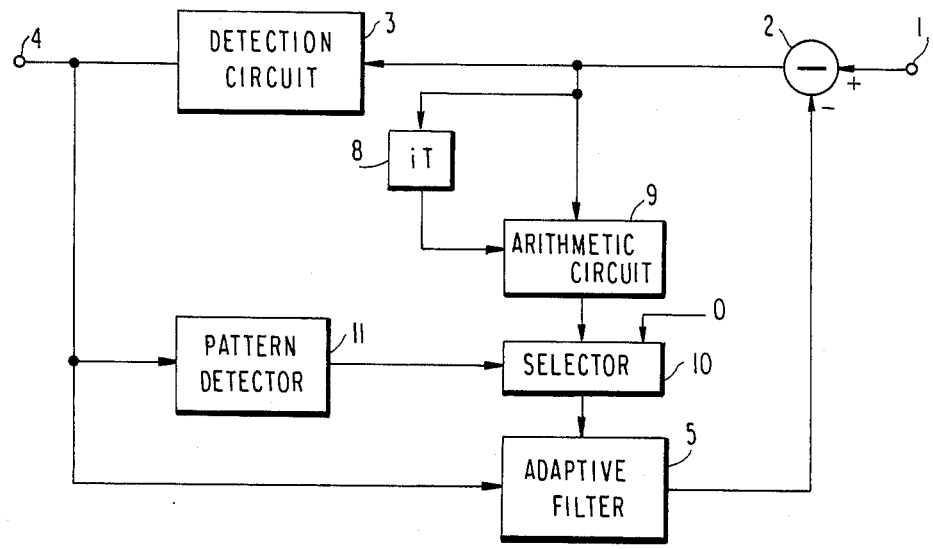
FIG. 3 is a block diagram of a DFE with a pattern detector according to an embodiment of the present invention.

Referring to FIG. 3, a DFE in accordance with the present invention is shown and includes an input terminal 1. A received signal which includes ISI is applied to the input terminal 1 and then to a subtractor 2. The subtractor 2 subtracts from the received signal an estimated ISI signal which is generated by an adaptive filter 5, thereby producing a residual signal which involves residual ISI. The residual signal is applied to an arithmetic circuit 9 after being delayed by a delay element 8 by i sampling times. The arithmetic circuit 9 cancels the data involved in the residual signal by the delayed signal to extract a residual ISI signal. In this particular embodiment, the cancellation by the circuit 9 is effected by subtraction of the two input signals. The residual signal from the subtractor 2 is also fed to a decision or detection circuit 3 which compares the residual signal with a reference value to determine an original two-level data sequence. This data sequence is routed to an output terminal 4, a pattern detector 11, and the adaptive filter 5. The decision circuit 3 may be conveniently implemented with a construction which is described in "A Study on the Subscriber Loop Transmission System for ISDN Based on the Echo Cancellation Technique" a paper presented at the IEEE International Conference on Communications which was held in Chicago, U.S.A. on July 23 to 26, 1985. From the output of the decision circuit 3, the pattern detector 11 detects decision a particular pattern from which the residual ISI signal can be extracted as will be described later and, the detected pattern is applied to a selector 10. In response to the pattern detection signal, the selector 10 selects either one of the residual ISI signal or a zero volt signal which is applied thereto and delivers the selected signal to the filter 5. Based on the output of the selector 10 and the data sequence of the decision circuit 3, the filter 5 corrects tap coefficients or filter coefficients and generates an estimated ISI signal. It is to be noted that the correction of filter coefficients does not occur when the selector 10 has selected a zero volt.

The reason why the residual ISI signal is can be obtained by cancelling the data involved in the residual signal is that the ISI signal of the residual signal and that of the delayed signal are not correlated. Because the value of the current ISI signal and that of the delayed ISI signal are not correlated, the value of the delayed ISI signal may be regarded as random noise. The delayed ISI signal has a symmetrical amplitude distribution with respect to the positive and negative polarities, and the probability that its amplitude d becomes $|d| \leq \delta$ (where $0 \leq \delta$) is not zero and assumes a certain positive value. It follows that the probability that the output of the arithmetic circuit 9 includes a residual ISI signal assumes a given positive value. Further, the magnitude of the residual ISI signal is generally sufficiently smaller than a received signal.

The pattern detector 11 is constructed and operated as follows. As previously stated, to extract the residual ISI signal, it is necessary for the data involved therein to be canceled from the residual signal. Assume that the MSK code as shown in FIG. 2 is used as a transmission line code, and that the delay time iT is 2T. Then, in order to cancel the data involved in the residual signal, the pulse shape at a time t=0 and the pulse shape at a time t=−2T have to be the same. In addition, because the pulse shapes at t=0 and t=−2T must be smoothly interconnected at t=−T by the transition of the MSK code, it is only when the code has consecutive patterns as shown in FIGS. 4A ("000") and 4B ("111") that the data cannot be canceled. It is noted that when the line code has patterns as shown in FIGS. 4C and 4D, cancellation of the data can be effected by adding the pulse shape at T=0 to the pulse shape at t=−2T. The pattern detector 11 is constructed to detect the code sequences "000" (FIG. 4A) and "111" (FIG. 4B) as mentioned above.

FIG. 5 shows a specific construction of the pattern detector 11. In FIG. 5, the input signal 51 corresponds to the data sequence outputted by the decision circuit 3 as shown in FIG. 3, and the input signal 52 to the mode signal. While in FIG. 3 the signal path between the decision circuit 3 and the pattern detector 11 and that between the circuit 3 and the filter 5 are each represented by a single path, in the case of MSK code they are representative of two signal paths each, one for the data signal and the other for the mode signal. Delay elements 53 and 54 each adapted to provide a delay of T seconds and an Exclusive-NOR (EXNOR) gate 55 cooperate to determine whether the current data and the which appeared 2T seconds earlier are coincident with each other. Likewise, delay elements 56 and 57 each adapted to provide a delay of T seconds and an EXNOR gate 58 cooperate to see if the current mode signal and the mode signal delayed by 2T seconds are coincident with each other. An AND gate 59 provides a union of the outputs of the EXNOR gates 55 and 58 to produce a pattern detection signal 60.

The pattern detector 11 will be described in relation to the biphase code as shown in FIG. 1 which is another possible transmission line code.

Assuming that the delay is 2T, the signals at t=0 and t=−2T must to have the same pulse shapes in order that residual ISI may be extracted, as is the case with the MSK code. However, once the code sequence "000" as shown in FIG. 6A is deteriorated on the transmission channel as shown in FIG. 6B, the latter half A of the pulse shape at t=0 and the former half B of the pulse shape at t=−2T are respectively dependent on pulse shapes at t=T and t=−3T. Specifically, if a data ONE appears at t=T, the pulse shape at t=0 is decided as shown in FIG. 6E and, if a data ZERO appears at t=T, it is decided as shown in FIG. 6F. Likewise, the pulse shape at t=−2T is decided as shown in FIG. 6C if a data ONE appears at t=−3T and as shown in FIG. 6D if a data ZERO appears thereat. It will thus be seen that while the pulse shapes of FIGS. 6D and 6F are identical with each other and, therefore, can cancel each other, the pulse shape of FIG. 6C and that of FIG. 6E or that of FIG. 6F are not identical and, therefore, cannot cancel each other.

In the same manner, in the case of a waveform representative of a code sequence "111", a data ONE appears at t=T and t=−3T; in the case of waveforms representative of "010" and "101", a data ZERO appears at t=T and t=−3T. In short, in order that a three-bits code which can be canceled may be detected, five-bit code checking is required; five-bit codes which can be canceled include four patterns in total, i.e. "00000", "10101", "11111" and "01010".

FIG. 7 shows a specific construction of the pattern detector 11 constructed to detect such five-bit patterns. As shown, the pattern detector includes EXNORs 71, 72 and 73 which function to dectect coincidence of the first and third bits of a five-bit code, that of the second and fourth bits, and that of the third and fifth bits, respectively. The detector also includes an AND gate 74 adapted to detect coincidence of outputs of the EXNORs 71 to 73.

Figure 8:
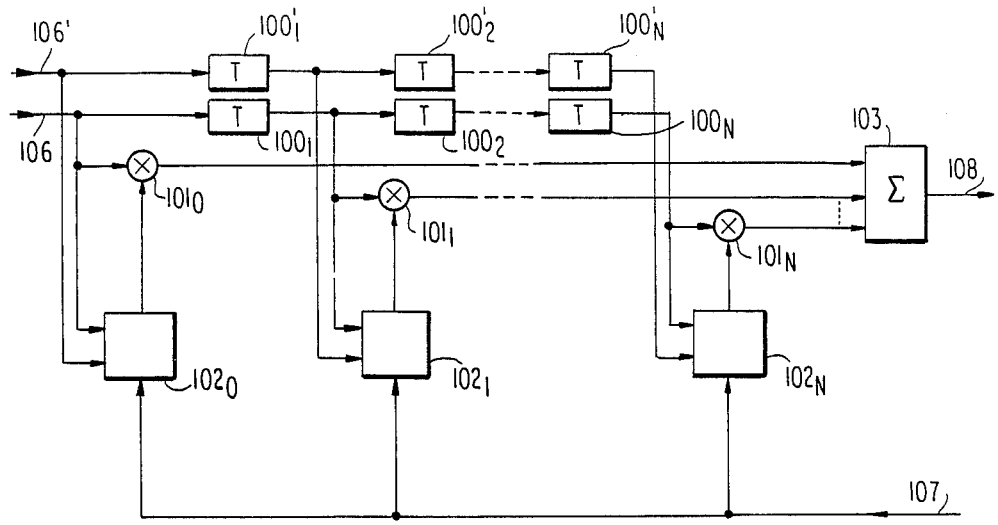
FIGS. 8, 11, 13 and 14 are circuit diagrams each showing a specific construction of an adaptive filter.

Referring to FIG. 8, the adaptive filter 5 of FIG. 3 is shown in a detailed block diagram. In FIG. 8, the input signals 106' and 106 respectively correspond to data (ZERO or ONE) and mode (positive or negative) which are outputted by the decision circuit 3 of FIG. 3. Further, the input and output signals 107 and 108 respectively correspond to output signals of the selector 10 and adaptive filter 5 of FIG. 3. The mode signal 106 is fed to a delay element $100_1$, a multiplier $101_0$, and a coefficient generator $102_0$. The data signal 106', on the other hand, is applied to a delay element $100'_1$ and the coefficient generator $102_0$. It should be noted that N in FIG. 8 is representative of the number of taps, which is a positive integer. In the drawing, the coefficient generators (CG) $102_0$ to $102_N$ are adapted to supply their associated multipliers $101_0$ to $101_N$ with coefficients corresponding to the respective modes in response to the mode signal 106'. The multipliers multiply outputs of their associated delay elements and the coefficients applied thereto, delivering the products to an adder 103. Summing up the products, the adder 103 delivers an estimated ISI signal as the output signal 108. Each of the coefficient generators $102_0$ to $102_N$ corrects its coefficient in response to a residual ISI signal which is fed as the input signal 107 and an output signal from its associated delay element.

Figure 9:
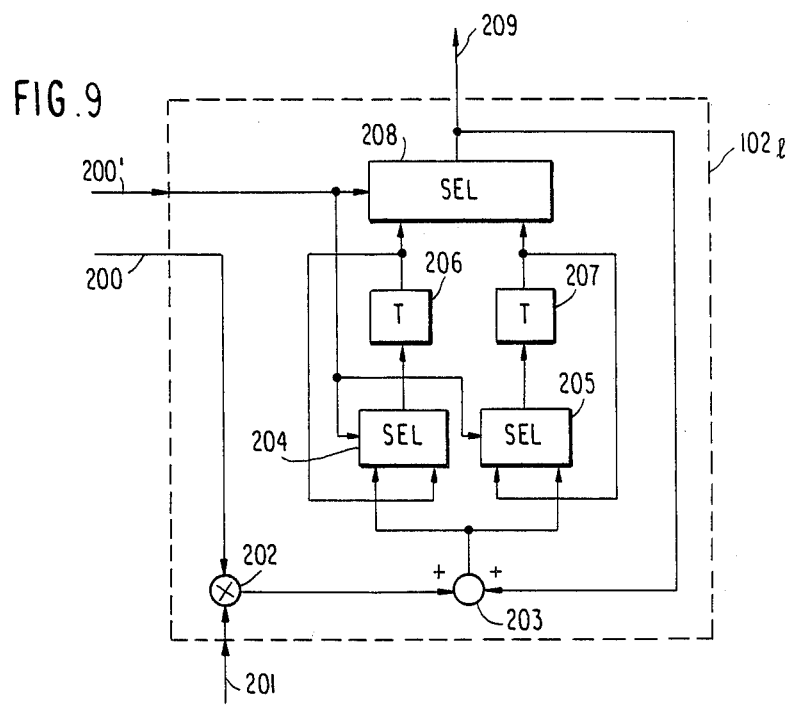
FIG. 9 is a diagram of a coefficient generator which is included in the filter.

Referring to FIG. 9, a specific construction of the coefficient generator $102_1$ ($1=0, 1, \ldots, N$) is shown. In FIG. 9, the input signal 200 corresponds to the input signal 106 or one of the output signals of the delay element $100_1, 100_2, \ldots, 100_N$ of FIG. 8. Likewise, the input signal 200' corresponds to the signal 106' or one of the outputs $100'_1, 100'_2, \ldots, 100'_N$ of FIG. 8, and the input signal 201 to the signal 107 of FIG. 8. Further, the output signal 209 of FIG. 9 corresponds to the output of the coefficient generator $102_1$ of FIG. 8. As shown, the data signal 200' which is representative of a ZERO or a ONE is fed as a control signal to selectors 204, 205 and 208. In addition, the mode signal 200 assuming a value of $+1$ or $-1$ which is representative of a $+$(positive) mode or a $-$(negative) mode and associated with the data signal 200' is applied to one input of a multiplier 202. Applied to the other input of the multiplier 202 is a residual ISI signal 201 which comprises an ISI component only. The multiplier 202 multiplies the mode signal 200 and the residual ISI signal 201 and delivers the product to one input of an adder 203. Delay elements 206 and 207 serve as coefficient memories which are respectively associated with a ZERO and a ONE of the data signal 200', the elements 206 and 207 being coupled to a selector 208. The data signal 200' is also fed to the selector 208 as a control signal. When the data signal 200' is a ZERO, the selector 208 selects a coefficient which is associated with a ZERO which is the output of the delay element 206 and, when the data signal 200' is a ONE, it selects a coefficient associated with a ONE which is the output of the delay element 207. The coefficient 209 selected by the selector 208 is delivered indicated as in FIG. 9. This coefficient 209 is routed also the adder 203 to be added to an output of the multiplier 202. The output of the adder 203 is fed to the selectors 204 and 205. The outputs of the delay elements 206 and 207 are applied also to the selectors 204 and 205, respectively. The outputs of the selectors 204 and 205 are applied to the delay elements 206 and 207, respectively. The selectors 204, 205 and 208 operate as follows. Assume that the data signal 200' is a ZERO. Then, the selector 208 selects the output of the delay element 206 which corresponds to the data ZERO, the selected delay output being delivered as a coefficient 209. The coefficient is fed to the adder 203 and then fed back to the delay element 206 via the selector 204, thereby updating the coefficient which is associated with the data ZERO. In addition, the selector 205 selects the output of the delay element 207 and feeds it back to the delay element 207 with the result that the coefficient associated with the data ONE is not updated. In contrast, when the data signal 200' is a ONE, the selector 208 selects the output of the delay element 207 which is associated with the data ONE. The resultant coefficient 209 is applied to the adder 203 and then fed back to the delay element 207 via the selector 205, whereby the coefficient associated with the data ONE is updated. The selector 204, on the other hand, selects the output of the delay element 206 and returns it to the element 206 with the result that the coefficient associated with the data ZERO is not updated. By the principle of operation described above, a particular coefficient which is associated with the value of the data signal, i.e., a ZERO or a ONE is selected for the arithmetic operation of the filter and, at the same time, the coefficient used is updated while the coefficient not used is not updated. In this manner, the coefficients of the filter are properly adapted.

Figure 10:
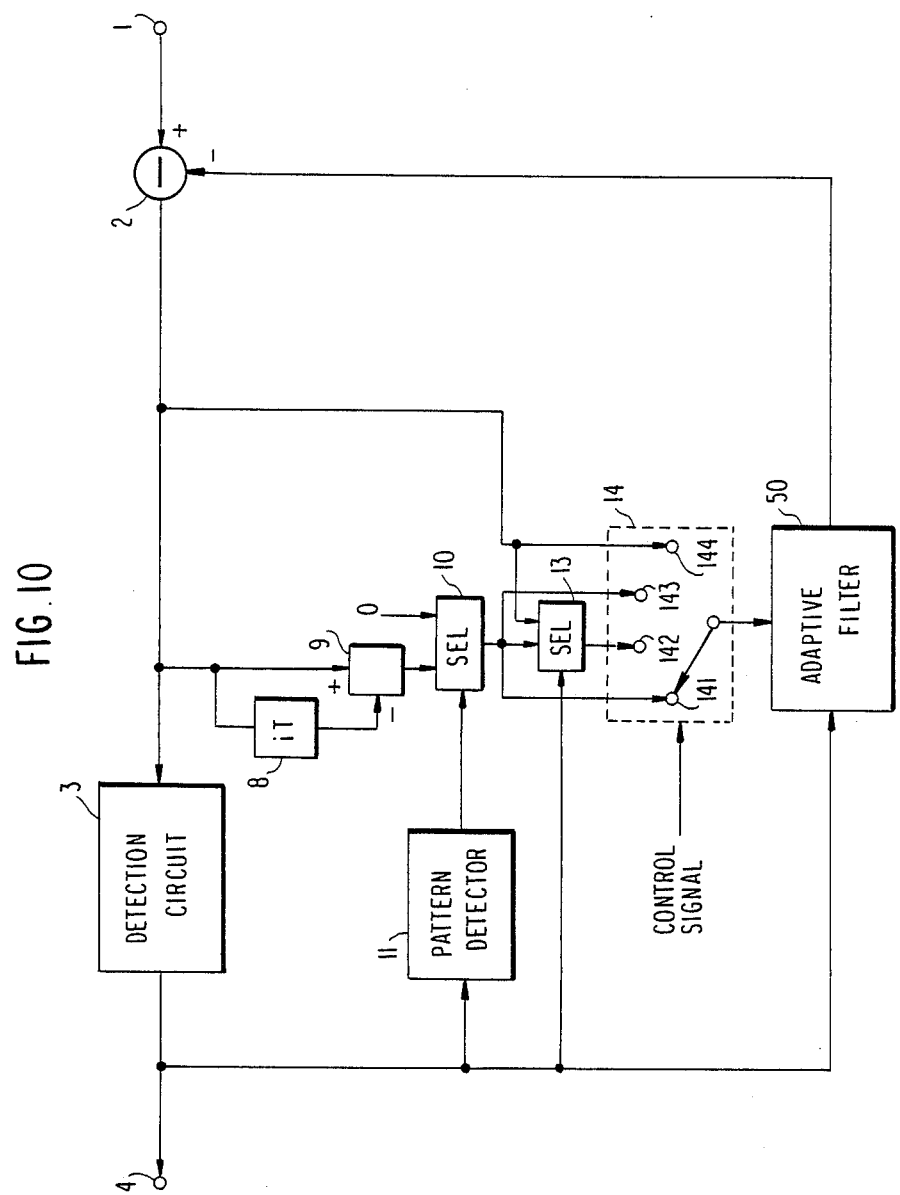
FIG. 10 is a block diagram showing a second embodiment of the present invention.

Referring to FIG. 10, a second embodiment of the present invention is shown. As is well known in the art, the zero-crossing point of a received signal changes as the transmission distance increases. Should the received signal be decided based on a clock signal which is derived from such a signal, the decision point would be shifted from a point where the data reaches the highest level The embodiment of FIG. 10 is constructed to eliminate this phenomenon.

In FIG. 10, the DFE includes a selector 13 adapted to select either the output of the selector 10 or the residual signal in response to an output of the decision circuit 3, and a switch 14. The switch 14 has a fourth terminal 144 for receiving the residual signal, first and third terminals 141 and 143 respectively, for receiving an output of the selector 10, and a second terminal 142 for receiving an output of the selector 13. At times $t_1=T/4$, $t_2=2/4 \cdot T$, $t_3=\frac{3}{4} \cdot T$ and $t_4=T$, the switch 14 sequentially selects the terminals 141 to 144 in response to the control signal. The signal selected by the switch 14 is fed to an adaptive filter 50. The filter 50 adjusts coefficients thereof such that the residual ISI at each time converges to zero.

Figure 11:
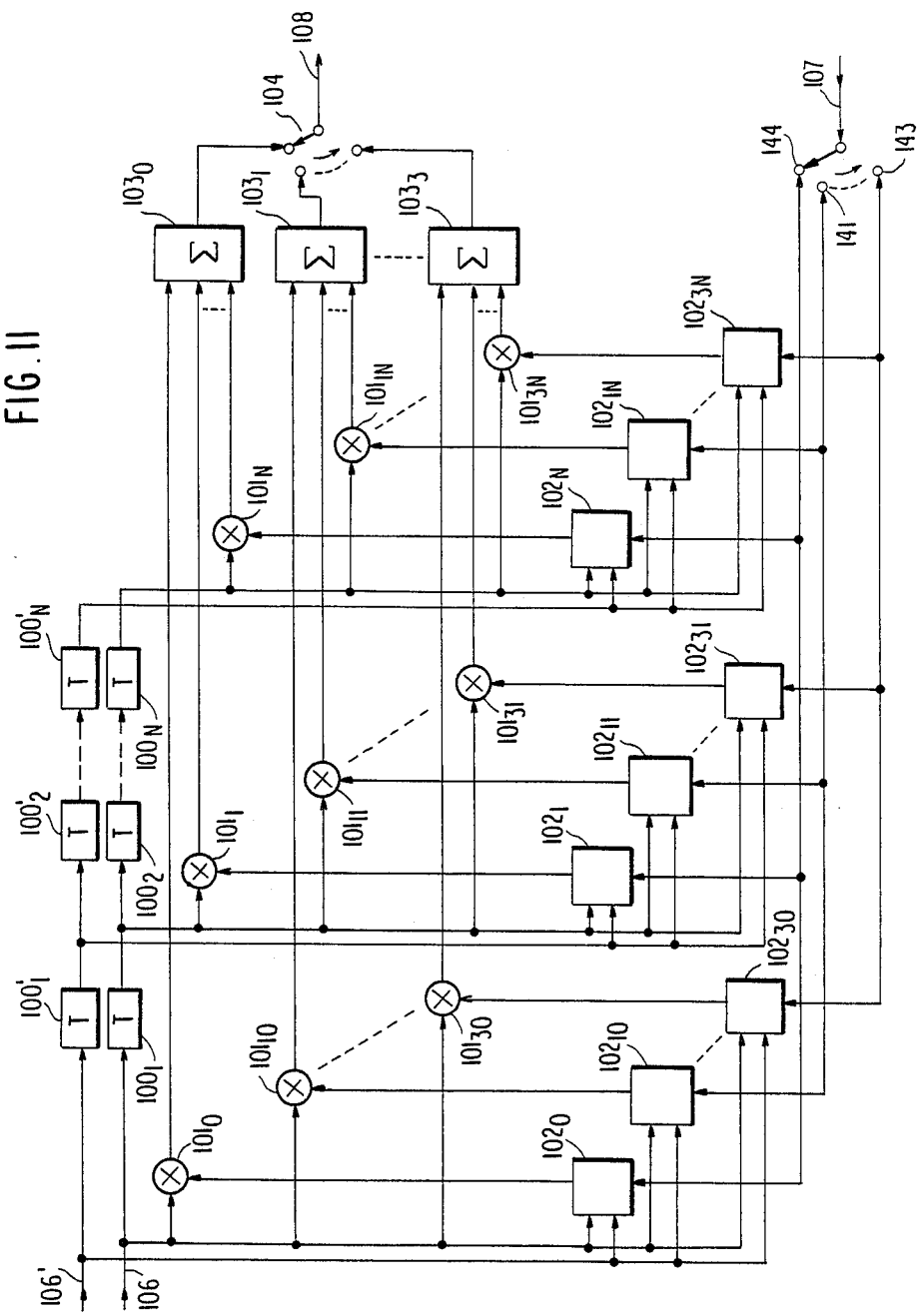

Referring to FIG. 11, a specific construction of the adaptive filter 50 is shown in a block diagram. The filter 50 includes, in addition to the structural elements of the filter of FIG. 8, multipliers, coefficient generators and adders which serve to process signals appearing at times $t_2=2/4 \cdot T$, $t_3=\frac{3}{4} \cdot T$ and $t_4=T$. In detail, multipliers $101_{1-0}$ to $101_{1-N}$, coefficient generators $102_{1-0}$ to $102_{1-N}$ and an adder $103_0$ are used for a data sequence appearing at $t_2=2/4 \cdot T$, multipliers $101_{30}$ to $101_{3N}$, coefficient generators $102_{30}$ to $102_{3N}$ and an adder $103_3$ is used for a data sequence appearing at $t_4=T$. The delay elements $100_1$ to $100_N$ and $100'_1$ to $100'_N$ are shared by the data sequences at $2/4 \cdot T$ to $4/4$.

Figure 12:
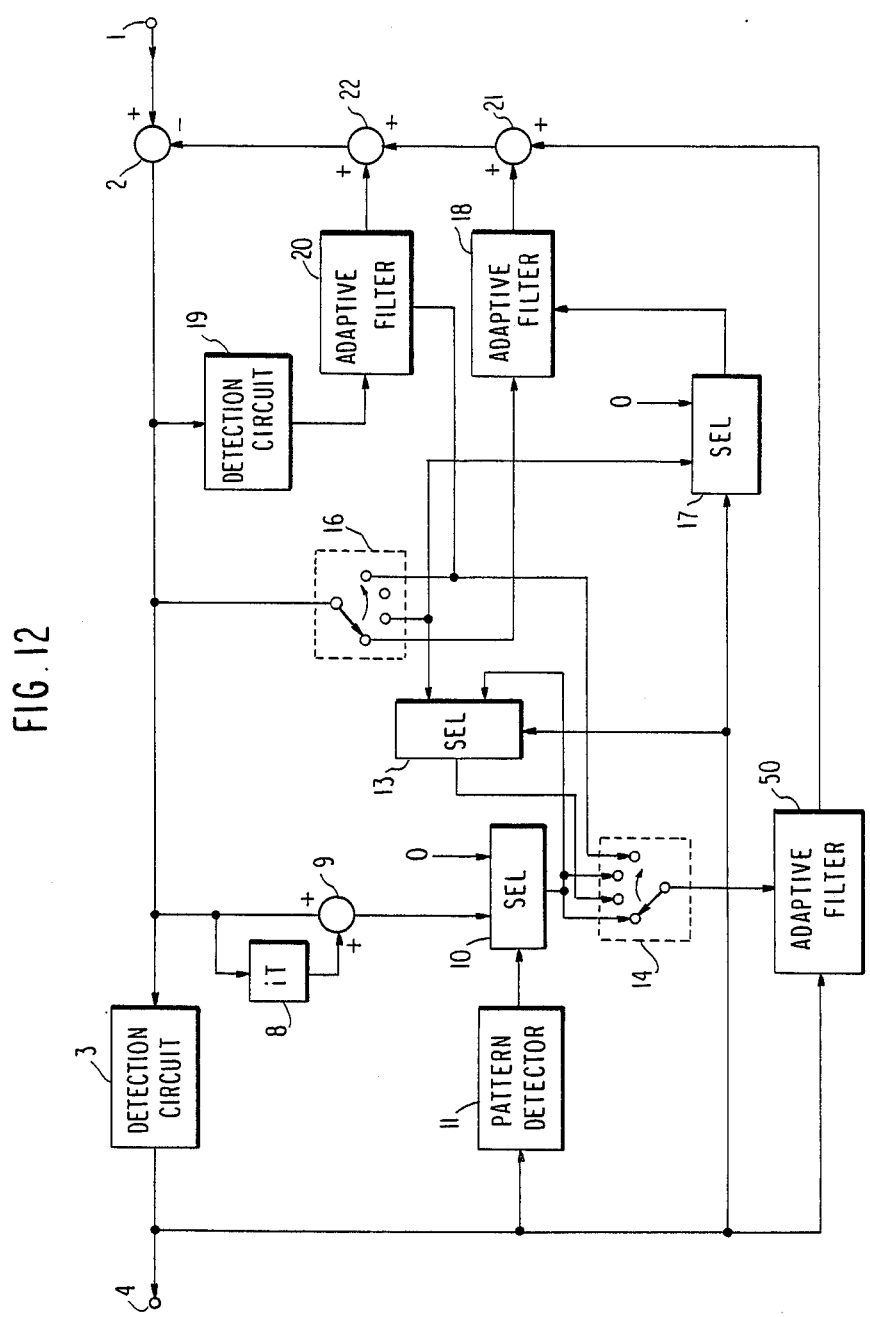
FIG. 12 is a block diagram showing a third embodiment of the present invention.

Referring to FIG. 12, a third embodiment of the present invention is shown. While the first and second embodiments each remove ISI by considering the effect of the past pulse shape on the current pulse shape, the third embodiment further removes intrasymbol interference (ITSI) by considering how the current pulse shape itself effects the current levels at times $2/4 \cdot T$ and $4/4 \cdot T$. As shown, the DFE of FIG. 12 includes a switch 16 for distributing the residual signal of the subtractor 2 at times $t_1=T/4$, $t_2=2/4 \cdot T$ and $t_4=T$. The signal at $T/4$ from the switch 16 is applied as data to a filter 18 while the output of the switch 16 at $t_4=T$ is regarded as an ITSI signal which appears at $t_4=T$ due to the pulse shape and is applied as a coefficient correction signal to a filter 20. Further, the output of the switch 16 at 2/4·T is regarded as an ITSI signal which appears at t=2/4·T due to the former half of the pulse shape and is applied as a coefficient correction signal to the filter 18. A selector 17 delivers to the filter 18 the signal appearing at 2/4·T or a zero volt when the output of the decision circuit 3 is a ONE or a ZERO, respectively. In response to the signal at T/4 from the switch 16 and the ITSI signal at 2/4·T from the selector 17, the filter 18 generates an estimated ITSI signal for removing the ITSI signal at 2/4·T. Likewise, the filter 20 responds to the data outputted by the detection circuit 19 and the ITSI signal at T by generating an estimated ITSI signal which removes the ITSI signal at T. An adder 21 sums outputs of the filters 50 and 18 to apply the sum to an adder 22 while the adder 22 sums an output of the filter 20 and that of the adder 21 to generate an estimated ITSI signal.

Figure 13:
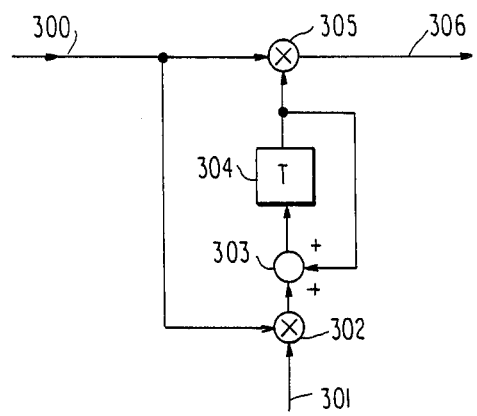

FIG. 13 shows a specific construction of the adaptive filter 18 of FIG. 12. In FIG. 13, the input signals 300 and 301 respectively correspond to an output signal of a first terminal of the switch 16 of FIG. 12, i.e., polarity of the residual signal at the sampling time $t_1$, and an output of the selector 17, i.e. polarity of an ITSI signal at the sampling time $t_2$ or an error signal which is a zero volt. Further, the output signal 306 as shown in FIG. 13 corresponds to the output signal, or estimated ITSI, of the adaptive filter 18 of FIG. 12. In FIG. 13, the polarity 300 of the residual signal is routed to multipliers 302 and 305. A delay element 304 adapted for a delay of T seconds serves as a coefficient memory and applies an output thereof to the multiplier 305 which then generates estimated ISI 306. Also, the output of the delay element 304 is fed back thereto via an adder 303 so that a coefficient associated with the output of the multiplier 302 is selectively updated. When the error signal 301 is zero, the output of the multiplier 302 is also zero and, therefore, the coefficient is not updated. In this manner, the coefficient is selectively updated. In the output of the adaptive filter 18 of FIG. 12, the estimated ITSI signal at the zero-crossing point, which occurs at the center within a symbol, appears and is added by the adder 21 to the estimated ITSI signal which is generated by the adaptive filter 50. The output of the adder 21 is fed to the subtractor 2 via the adder 22.

Figure 14:
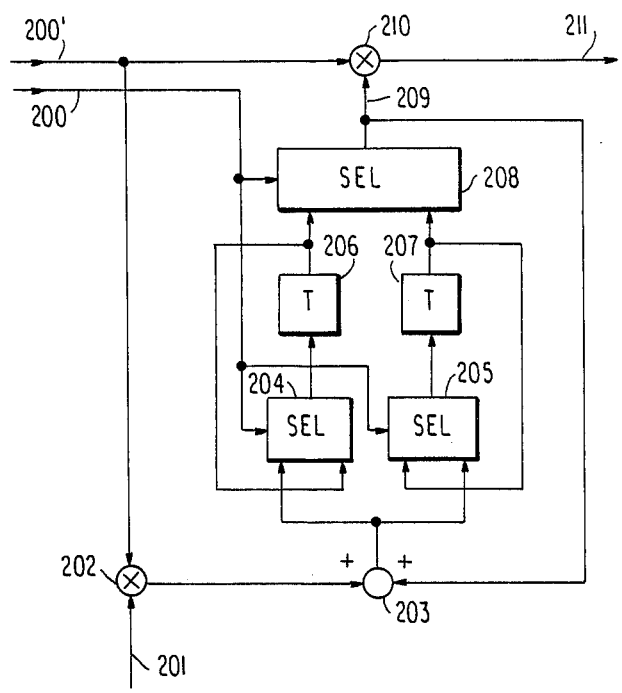

Referring to FIG. 14, a specific construction of the adaptive filter 20 of FIG. 12 is shown in a detailed block diagram. The filter 20 corresponds to only one phase and one tape of the filter 50. The principle of operation of the filter 20 for updating the coefficients is the same as that of FIG. 9 and, therefore, detailed description thereof will be omitted to avoid redundancy. In FIG. 14, the same function blocks and signals as those of FIG. 9 are designated by like reference numerals. It should be noted, however, that in FIG. 14 the data signal 200 and the mode signal 200' correspond to the outputs of the decision circuit 3 of FIG. 10, and the error signal 201 to the output of the fourth terminal of the switch 16 as shown in FIG. 12. The filter of FIG. 14 differs from that of FIG. 9 in that the mode signal 200' is multiplied at a coefficient 209 by a multiplier 210 to produce estimated ITSI 211. Another difference is that while the error signal 201 in FIG. 9 selectively assumes three values, i.e., ±1 and 0, the error signal in FIG. 14 assumes either one of two values, i.e. +1. The estimated ITSI which is outputted by the adaptive filter 20 is applied to the adder 22 to be added to an output of the adder 21, the sum being fed to the subtractor 2.

In all the embodiments shown and described, the arithmetic unit 9 performs subtraction on an input signal and a delayed signal in order to cancel a data involved in a residual signal. If desired, the subtraction may be replaced with addition in which case a consecutive symbol pattern is selected such that, as shown in FIGS. 4C and 4D, the wave shape of one of the current input signal and the delayed signal becomes identical in pulse shape to that of the other when inverted. In the pattern detector 11 of FIG. 5, the EXNOR 58 responsive to coincidence of mode signals may be replaced with an Exclusive-OR gate which is responsive to non-coincidence of mode signals. Although the sampling period T/R has been assumed to be T/4 seconds in the foregoing description, it will be apparent that the principle of the present invention is effective so long as R is a positive even number. Furthermore, while the embodiments of FIGS. 10 and 12 have been described in relation to MSK code of FIG. 2, the present invention is similarly applicable to biphase code as shown in FIG. 1.

In summary, it will be seen that in accordance with the present invention the adaptive operation of an adaptive filter is ensured because the filter is controlled such that the coefficients are selectively updated by detecting the pattern of a received signal waveform appearing when either a sum or a difference between the current value of a residual signal and a value of the same appeared iT seconds earlier is equal to the ITSI signal. This accomplishes decision feedback type removal of ISI which eliminates the need for complicated control and can be implemented with a simple and small-scale hardware configuration. In addition, the present invention allows not only ISI due to a past sequence of symbols but also ISI within a sequence of data to be removed.

What is claimed is:

1. A decision feedback equalizer comprising:

adaptive filter means (5) responsive to a demodulated data sequence and a residual intersymbol interference (ISI) signal for estimating an intersymbol interference signal which occurs during pulse transmission of a period of T seconds and producing a first estimated intersymbol interference signal;

subtraction means (2) for subtracting the first estimated intersymbol interference signal from a received signal which includes the intersymbol interference signal to produce a residual signal;

means (9) for extracting the residual intersymbol interference signal from the residual signal and a delayed residual signal which is produced by delaying the residual signal;

demodulating means (3) for producing the demodulated data sequence from the residual signal and applying the data sequence to said filter means;

pattern detector means (11) for detecting a particular consecutive pattern out of the demodulated data sequence; and means (10) for applying the residual intersymbol interference signal to said filter means in response to an output of said pattern detector means.

2. A decision feedback equalizer for receiving a signal which includes a pulse transmission of a period of T seconds, an eliminating an intersymbol interference signal from the received signal, said equalizer comprising:

adaptive filter means (50) responsive to a demodulated data sequence and N sample signals for estimating the intersymbol interference signal which occurs during the pulse transmission of T seconds and producing an estimated intersymbol interference signal comprising N individual estimated intersymbol interference signals, wherein N is a number;

subtraction means (2) for subtracting the estimated intersymbol interference signal from the received signal to produce a residual signal;

means (9) for extracting a residual intersymbol interference signal from the residual signal and a delayed residual signal which is produced by delaying the residual signal;

demodulating means (3) for producing the demodulated data sequence from the residual signal;

pattern detector means (11) for detecting a particular consecutive pattern out of the demodulated data sequence;

a first selector means (10) for outputting one of the residual intersymbol interference signal and a reference signal in response to an output of said pattern detector means;

a second selector means (13) for outputting one of the residual signal and the output of said first selector means in response to the demodulated data sequence;

first sampling switch means (14) for selectively connecting, at periods of T/N, the output of said first selector means, the output of said second selector means, and the residual signal to said adaptive filter means so as to connect said adaptive filter means with the N sample signals during T seconds; and means for applying the N individual estimated intersymbol interference signals sequentially to said subtraction means at a period of T/N.

3. A decision feedback equalizer as claimed in claim 2, wherein said adaptive filter means comprises N individual adaptive filter means, and said first sampling switch means selectively connects the N sample signals with respective ones of said N individual adaptive filter means.

4. A decision feedback equalizer for receiving a signal which includes a pulse transmission of a period of T seconds, and eliminating an intrasymbol interference signal and an intersymbol interference signal from the received signal, said equalizer comprising:

first adaptive filter means (50) responsive to a first demodulated data sequence and N sample signals for estimating the intersymbol interference signal which occurs during the pulse transmission of T seconds and producing an estimated intersymbol interference signal, wherein N is a number;

means (2) for subtracting a total estimated interference signal from the received signal to produce a residual signal;

means (9) for extracting a residual intersymbol interference signal from the residual signal and a delayed residual signal which is produced by delaying the residual signal;

a first demodulating means (3) for producing the first demodulated data sequence from the residual signal;

pattern detector means (11) for detecting a particular consecutive pattern out of the first demodulated data sequence;

a first selector means (10) for outputting one of the residual intersymbol interference signal and a first reference signal in response to an output of said pattern detector means;

first sampling switch means (16) receiving the residual signal for outputting the residual signal at a first time T/N, a second time 2T/N and a third time T;

a second selector means (13) for outputting one of the residual signal produced by said first sampling switch means at said second time and an output of the first selector means in response to the first demodulated data sequence;

second sampling switch means (14) for selectively connecting, at periods of T/N, the output of said first selector means, the output of said second selector means, and the residual signal produced by the first sampling switch means at said third time so as to connect the first adaptive filter means with the N sample signals during T seconds;

a third selector means (17) for selectively outputting one of the residual signal produced by said first sampling switch means at said second time and a second reference signal in response to the first demodulated data sequence;

second adaptive filter means (18) responsive to the residual signal produced by said first sampling switch means at said first time and the output of said third selector means for outputting a first partial estimated intrasymbol interference signal;

second demodulating means (19) for outputting a second demodulated data sequence from the residual signal;

third adaptive filter means (20) responsive to said second demodulated data sequence and the residual signal produced by said first sampling switch means at said third time for outputting a second partial estimated intrasymbol interference signal; and means (21, 22) for adding the estimated intersymbol interference signal, the first partial estimated intersymbol interference signal, and the second partial estimated intrasymbol interference signal to produce the total estimated interference signal.

5. A decision feedback equalizer as claimed in claim 4, wherein N equals 4.

6. A decision feedback equalizer as claimed in claim 4, wherein the means for adding comprises a first adder (21) for adding the first partial estimated intrasymbol interference signal to the estimated intersymbol interference signal to obtain a subtotal signal, and a second adder (22) for adding the second partial estimated intrasymbol interference signal to the subtotal signal.

7. A decision feedback equalizer as claimed in claim 4, wherein said second adaptive filter means (18) comprises a first multiplier means (302) for multiplying the output of the third selector means by the residual signal produced by said first sampling switch means at said first time, an adder circuit (303) for adding an output of said first multiplier means by a delayed signal, and a delay circuit (304) for delaying an output of the adder circuit by T seconds to produce the delayed signal, and a second multiplier means (305) for multiplying the delayed signal and the residual signal produced by said first sampling switch means at said first time.

* * * * *

UNITED STATES PATENT AND TRADEMARK OFFICE
CERTIFICATE OF CORRECTION

PATENT NO. : 4,730,343
DATED : March 8, 1988
INVENTOR(S) : KANEMASA ET AL

It is certified that error appears in the above-identified patent and that said Letters Patent is hereby corrected as shown below:

Column 1, line 19, after "dicted" insert --and--

Column 2, line 39, after "shapes" insert --,--

Column 3, line 1, delete "i" and insert --$\underline{i}$--

Column 3, line 21, after "and" delete "," and after "later" insert --,--

Column 4, line 11, after "and the" insert --data--

Column 4, line 55, delete "dectect" and insert --detect--.

Column 6, line 33, after "143" insert --.--

Column 6, line 54, delete "4/4" and insert --4/4.T--

Column 7, line 49, delete "tape" and insert --tap--

Column 7, line 65, delete "+1", and insert --$\pm$--

Signed and Sealed this

Seventh Day of February, 1989

Attest:

DONALD J. QUIGG

*Attesting Officer*  *Commissioner of Patents and Trademarks*